May 28, 1968     E. T. ABLE ETAL     3,386,031

HELICOPTER ROTOR BLADE TRACKERS

Filed June 1, 1965     2 Sheets-Sheet 1

INVENTORS.
EDWARD T. ABLE
LYMAN L. BLACKWELL
DONALD R. STEELE
BY

ATTORNEY

INVENTORS.
EDWARD T. ABLE
LYMAN L. BLACKWELL
DONALD R. STEELE
BY

ATTORNEY

United States Patent Office 3,386,031
Patented May 28, 1968

3,386,031
HELICOPTER ROTOR BLADE TRACKERS
Edward T. Able, Lyman L. Blackwell, and Donald R. Steele, Denver, Colo., assignors to B. K. Sweeney Manufacturing Co., Denver, Colo.
Filed June 1, 1965, Ser. No. 460,199
6 Claims. (Cl. 324—61)

ABSTRACT OF THE DISCLOSURE

A capacitance element positioned adjacent the plane of rotation of the blades of a helicopter rotor to modulate the frequency of an inductance-capacitance oscillator, the output of which controls an oscilloscopic display showing an independent signal for each passing blade for comparison to determine misalignment.

---

This invention relates to a method and means: for checking the blades of a propeller or rotor, more particularly a bladed helicopter rotor, to determine whether the blades are all rotating in the same flight path or track and for individually detecting any misaligned blade or blades, and measuring the degree of misalignment thereof, so that accurate correction may be readily accomplished.

The principal object of the invention is to provide an improved method and means for indicating the relative positions of the blades of a rotating rotor as they individually pass a given point to determine that the blades are uniformly spaced from a selected reference plane positioned at right angles to the axis of rotation.

Another object is to provide electronic means for accomplishing the above which will be readily portable so that it may be quickly, easily and accurately positioned adjacent to the rotor to be tested and which will identify misaligned blades and produce an instant, accurate, visible indication of the degree of misalignment thereof.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

Figure 1:
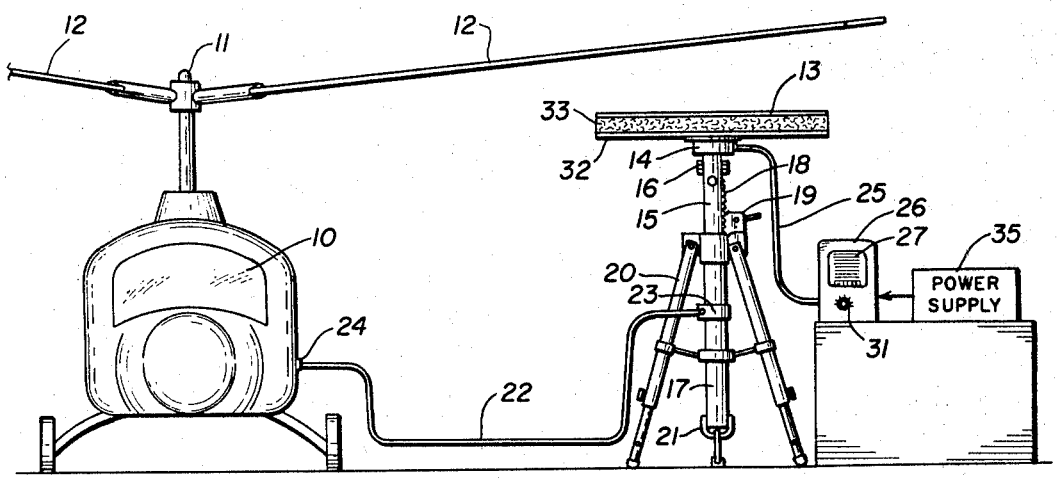
FIG. 1 is a schematic elevational view showing the relation of the elements of this invention to a conventional helicopter rotor.
Figure 2:
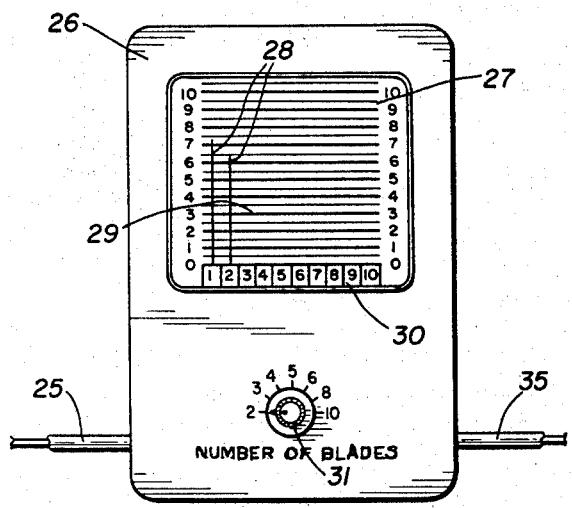
FIG. 2 is a front elevational view of what will be herein referred to as a tracking scope cabinet which is employed herein.

Since helicopter rotor blades are subject to various forces and stresses during rotation, this invention is designed for scanning the blades while the latter are rotating at operational speeds.

The method employed is relatively simple, yet highly effective. It comprises electrically connecting a propeller rotor to one side of a capacitance element and fixedly supporting a metal plate, connected to the other side of the capacitance element, adjacent to the plane of rotation of the blades of said rotor so that the blades passing over the plate will produce a capacitance modulation which is applied to an inductance-capacitance tuned circuit to modulate the frequency of a vacuum tube oscillator. The output oscillations of the oscillator are demodulated and converted to control a visual signal apparatus such as a cathode ray tube to produce a signal display corresponding to the relative distance between each passing blade and the fixed plate. The display signals will be identical if all blades are traveling in the same rotational track but will vary if one or more blades are misaligned from the track. The variations are proportional to the degree of misalignment and may be indexed to give an exact measurement of misalignment, if any, of the blades.

The method and an embodiment for carrying out the objects of the invention are illustrated in the accompanying drawings in which a conventional helicopter is illustrated at 10 with its blade rotor at 11 and blades at 12. The helicopter illustrated is provided with two blades 12. The invention, however, will apply regardless of the number of blades and regardless of the number of rotors.

The apparatus employs a capacitance pickup element consisting of an upper metallic pickup plate 13 and a lower, similar metallic shielding plate 32. The plates 13 and 32 are maintained in parallel, electrically insulated relation by an intervening layer of dielectric material such as honeycomb paper 33. The shielding plate 32 is mounted on and grounded to a hollow, cup-shaped, metallic detector head 14 which in turn in adjustably mounted on the upper extremity of a tripod post 15 through the medium of a suitable clamp bolt 16. The post 15 extends vertically downward into, and is grounded to, a tripod sleeve 17 in which it is vertically adjustable, such as through the medium of a toothed rack 18 and a pinion 19. The sleeve 17 is vertically supported by means of suitable, folding tripod legs 20. The sleeve 17 is preferably provided with a tie-down bail 21 by means of which it may be anchored to the ground to prevent overturnment by the wind from the blades 12. A ground conductor 22 extends from a ground clamp 23 on the sleeve 17 to a suitable ground connection 24 on the helicopter 10.

Figure 3:
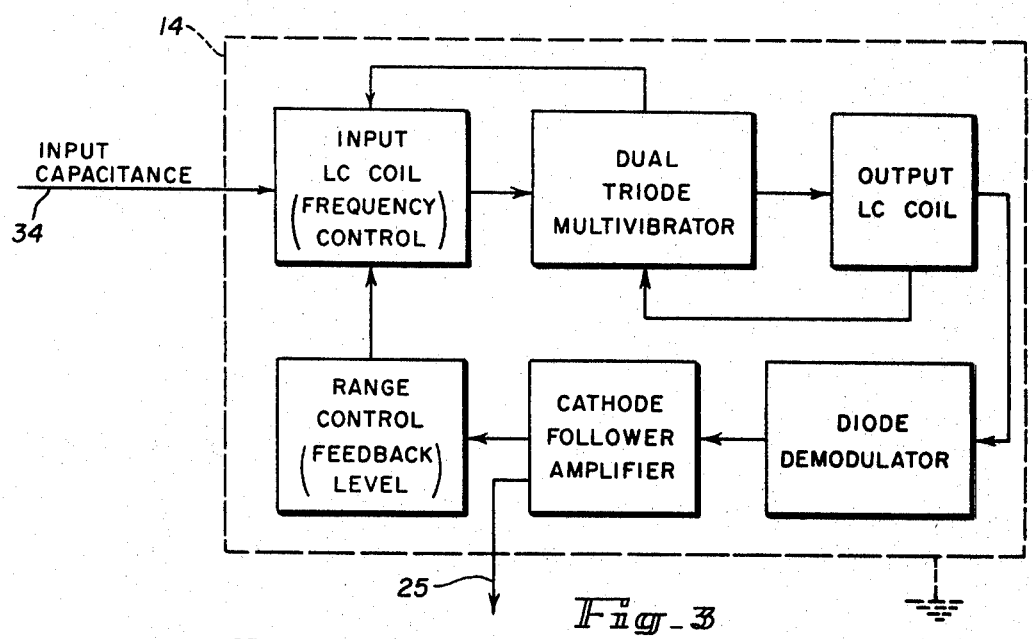
FIG. 3 is a schematic block diagram of the electronic elements contained in what will be herein referred to as a detector head.

The detector head 14 encloses an oscillator having an inductance-capacitance tuned, oscillating circuit, as indicated in FIG. 3, to which the capacitance modulation caused by the blades 12 passing over the pickup plate 13 is applied, through an insulated conductor 34, to produce output pulsations, the amplitude of which is controlled by the positions of the blades relative to the pickup plate 13.

Figure 4:
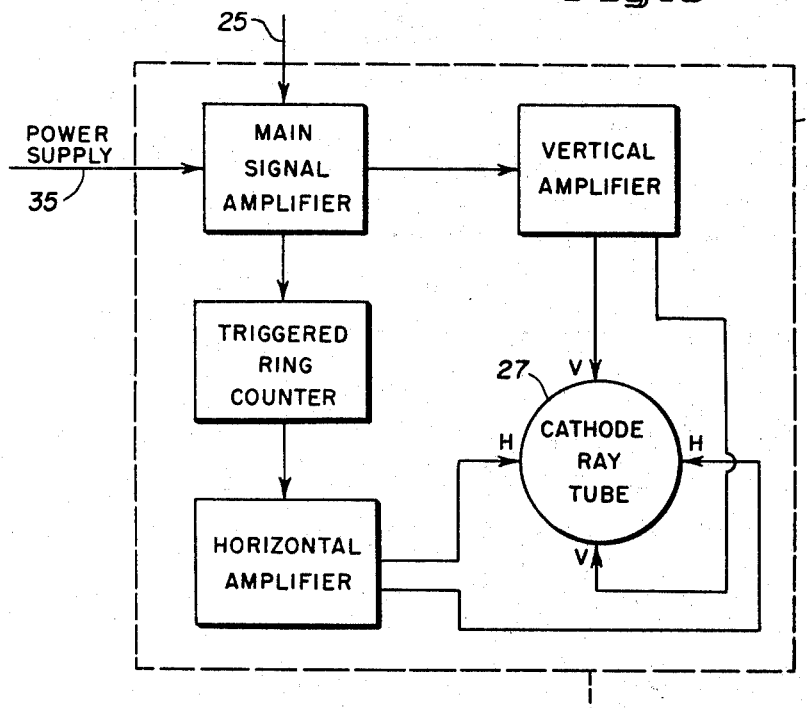
FIG. 4 is a similar diagram of the principal electronic elements contained in the tracking scope cabinet of FIG. 2.

The output pulsations of the oscillating circuit of the detector head are fed, through a shielded, conductor cable 25, to the tracking scope cabinet 26 containing the necessary instrumentation, for instance, such as indicated in FIG. 4, to demodulate and convert the output oscillator pulsations into oscilloscope signals to actuate a cathode ray tube 27 so as to illuminate, horizontally-spaced-apart, vertical signal lines 28 on the fluorescent face of the tube 27.

The height or length of the vertical signal lines can be read, preferably in inches, on a distance scale 29 etched or otherwise marked on a grid, positioned in front of the face of the cathode ray tube 27. Each vertical signal line 28 designates one of the blades on the propeller being tracked. The lines are horizontally indexed by numerals appearing on a horizontal blade index scale 30 on the grid.

The length of each vertical signal line 28 is in correspondence with the amplitude of the signal received from the oscillator during the passage of a blade over the pickup plate 13. The horizontal travel of the oscilloscope beam is preset by means of a "number-of-blades" selector 31 on the instrument panel of the tracking scope cabinet 26.

Thus, for a two-blade propeller, as indicated in FIG. 1, the selector 31 would be set at "2." As a result, the first blade passing over the capacitance pickup plate 13 would produce a vertical signal line 28 over the numeral "1" on the scale 30. The second passing blade would produce, through the medium of a triggered ring-counter circuit, as indicated in FIG. 4, a second vertical signal line 28 over the number "2" on the blade index scale 30 and the returning first blade would then repeat its signal over the number "1" followed by a repeat over the number "2." This repetitive, blade-counting procedure would occur for whatever number of blades the selector 31 is preset.

It is believed that the power supply, indicated at 35, and the detail electronic circuits to actuate the above elements are within the skill of electronic engineers. Briefly, the oscillator, which generates a carrier frequency for signal modulation, is a variation of a multivibrator in which the input vacuum tube grid uses an LC tuned pair for ground return, in place of the conventional grid return resistor. The tuned LC pair and oscillator coupling capacitors are adjusted so that the LC pair controls oscillator frequency, and in addition converts the usual square wave form voltage to sinewave.

The oscillator output anode is capacitance coupled to an output inductance-capacitance tuned circuit, adjusted to resonate just above oscillator frequency. A minimum value of coupling capacitance is used to prevent the output LC pair from influencing oscillator frequency, but sufficient to carry the modulated carrier signal to a voltage divider of the output LC pair and series demodulator.

In effect, the capacitance variations of passing helicopter blades provides an oscillator frequency modulation and, since the output circuit of the oscillator includes a FM detector and demodulator, a voltage analog of instantaneous electrical capacitance is developed.

More specifically, oscillator frequency is a function of input LC tuned circuit values, $$f = \frac{1}{2\pi\sqrt{LC}}$$

where C is the varying capacitance. As helicopter blades pass over the pickup plate, oscillator frequency changes in step. The output LC tuned circuit is adjusted slightly under maximum impedance (capacitive) at oscillator frequency, controlled in turn by input LC resonance. As input capacitance increases, resonant frequency drops, output LC impedance drops, and voltage signal across the series demodulator rises.

The high-Q of the input LC tuned circuit and precise capacitance adjustments make it possible to resolve a differential capacitance of 0.001 picofarad; this is 1/500 the capacitance increment when a rotor blade moves directly over the pickup, from a remote position. The output LC tuned circuit has a lower Q and broader impedance characteristic; the reference operating point on this characteristic corresponds to helicopter blades 75 inches higher than the pickup plate. For small helicopters where the distance to blades is less than 75 inches, the average capacitance effect of the rotating blades is increased, resonant frequency is decreased and the operating point on the output impedance characteristic moves toward a region of lower gain. For large helicopters where the distance to blades is more than 75 inches, average input capacitance is reduced, resonant frequency is increased, and the operating point moves toward a region of higher gain. Use of this automatic gain control feature makes it possible to vary the measurement distance from 75 inches up to 150 inches and down to 37½ inches, with no change in display sensitivity for a given out-of-track condition.

While a specific form of the invention has been described and illustrated herein, it is to be understood that the same may be varied within the scope of the appended claims, without departing from the spirit of the invention.

Having thus described the invention what is claimed and desired to be secured to Letters Patent is:

1. A helicopter rotor blade tracker comprising: a capacitance pickup plate; an adjustable support supporting said pickup plate below the plane of rotation of the blades of said rotor; an inductance-capacitance tuned oscillator; means electrically connecting said blades and said plate to said oscillator to modulate the capacitance of the latter so as to produce a pulsating signal in consequence of the passage of said blades over said plate during rotation of said rotor; a cathode ray tube having an oscilloscope screen, a vertical amplifier and a horizontal amplifier controlling the vertical and the horizontal beam swings, respectively, of the ray of said tube; means for simultaneously impressing the output of said oscillator simultaneously upon both said vertical amplifier and said horizontal amplifier; and means positioned in the input to said horizontal amplifier sequentially interrupting the input to the latter so as to horizontally space the signal received from each blade from the signals received from the preceding blades on said oscilloscope screen.

2. A helicopter rotor blade tracker comprising: a capacitance pickup plate; and adjustable support supporting said pickup plate below the plane of rotation of the blades of said rotor; an inductance-capacitance tuned oscillator; means electrically connecting said blades and said plate to said oscillator to modulate the capacitance of the latter so as to produce a pulsating signal in consequence of the passage of said blades over said plate during rotation of said rotor; a grounded metallic shielding plate positioned below and in substantially parallel relation with said pickup plate and separated from the latter by dielectric material to shield said pick-up plate from extraneous capacitance interference; and a cathode ray tube upon which the pulsating output of said oscillator is impressed to produce oscilloscope signals, said signals being vertical, fluorescent, signal lines on the screen of said cathode ray tube, each signal line designating one of the blades being tracked, the vertical length of said lines being in correspondence with the amplitude of the signal received from said oscillator, the pulsating output of said oscillator being simultaneously fed to a vertical amplifier controlling the vertical beam swing of said cathode ray tube and to a trigger-ring-counter circuit which intermittently controls the horizontal beam swing of said cathode ray tube to horizontally separate said vertical signal lines on said screen so that each line will indicate the amplitude of a signal designating a particular one of said blades.

3. A helicopter rotor blade tracker as described in claim 2 having a manually preset selector in circuit with said trigger-ring-counter for presetting the number of vertical signal lines to be displayed in accordance with the number of blades on said rotor.

4. A helicopter rotor blade tracker as described in claim 3 having a vertically indexed scale positioned on the oscilloscope screen for reading the heights to which said vertical signal lines arise, said scale indicating the distance between each passing blade and said pickup plate.

5. A helicopter rotor blade tracker as described in claim 4 having a horizontally positioned, number-of-blades index scale positioned on the oscilloscope screen for indicating the particular blade to which each vertical signal line refers.

6. A helicopter rotor blade tracker comprising: a capacitance pickup plate; an adjustable support supporting said pickup plate below the plane of rotation of the blades of said rotor; an inductance-capacitance tuned oscillator; means electrically connecting said blades and said plate to said oscillator to modulate the capacitance of the latter so as to produce a pulsating signal in consequence of the passage of said blades over said plate during rotation of said rotor; a grounded metallic shielding plate positioned below and in substantially parallel relation with said pickup plate and separated from the latter by dielectric material to shield said pickup plate from extraneous capacitance interference; a cathode ray tube having a vertical amplifier and a horizontal amplifier, controlling the vertical and horizontal beam swings, respectively, of said tube and a trigger-ring-counter controlling the input to said horizontal amplifier, the pulsating output of said oscillator being simultaneously impressed on both said vertical amplifier and said trigger-ring-counter so that the latter will horizontally separate the oscilloscope signals produced by the passage of successive blades of said rotor and so that the magnitude of each signal will be in correspondence with the amplitude of the signal received from said oscillator during the passage of each respective blade.

References Cited

UNITED STATES PATENTS

| | | |
|---|---|---|
| 1,965,147 | 7/1934 | Marvel. |
| 2,455,053 | 11/1948 | Flint _____ 73—455 XR |
| 3,089,332 | 5/1963 | Comstock. |
| 3,217,204 | 11/1965 | Nance. |
| 3,221,563 | 12/1965 | Wing _____ 73—517 XR |

OTHER REFERENCES

"Instruments & Control Systems," November 1964, article entitled "Capacitive Transducers," pp. 77–85, by Foldvari et al.

JAMES J. GILL, *Primary Examiner.*